(12) United States Patent
Rong et al.

(10) Patent No.: US 12,348,051 B2
(45) Date of Patent: Jul. 1, 2025

(54) CAPACITIVE WIRELESS POWER TRANSFER COUPLER AND APPLICATION THEREOF

(71) Applicant: NAVAL UNIVERSITY OF ENGINEERING, Wuhan (CN)

(72) Inventors: Enguo Rong, Wuhan (CN); Pan Sun, Wuhan (CN); Xusheng Wu, Wuhan (CN); Jin Cai, Wuhan (CN); Kangheng Qiao, Wuhan (CN); Xiaochen Zhang, Wuhan (CN); Gang Yang, Wuhan (CN); Lei Wang, Wuhan (CN); Yan Liang, Wuhan (CN)

(73) Assignee: NAVAL UNIVERSITY OF ENGINEERING, Wuhan (CN)

( * ) Notice: Subject to any disclaimer, the term of this patent is extended or adjusted under 35 U.S.C. 154(b) by 0 days.

(21) Appl. No.: 18/814,214

(22) Filed: Aug. 23, 2024

(65) Prior Publication Data
US 2025/0079889 A1 Mar. 6, 2025

(30) Foreign Application Priority Data
Sep. 1, 2023 (CN) .......................... 202311118419.2

(51) Int. Cl.
  *H02J 50/05* (2016.01)
  *H01G 4/38* (2006.01)
  *H01G 4/20* (2006.01)

(52) U.S. Cl.
  CPC ............... *H02J 50/05* (2016.02); *H01G 4/38* (2013.01); *H01G 4/20* (2013.01)

(58) Field of Classification Search
  CPC .............. H02J 50/05; H01G 4/38; H01G 4/20
  See application file for complete search history.

(56) References Cited

U.S. PATENT DOCUMENTS

| 11,183,452 | B1* | 11/2021 | Mueller-Meskamp ..................... H03K 17/689 |
| 11,502,542 | B2* | 11/2022 | Afridi .................... H02J 7/0013 |
| 2011/0090030 | A1* | 4/2011 | Pagani .................... H02J 50/05 333/24 C |
| 2013/0082540 | A1* | 4/2013 | Christ ...................... H04B 5/22 307/109 |

(Continued)

FOREIGN PATENT DOCUMENTS

| CN | 113812062 A | 12/2021 |
| CN | 116317213 A | 6/2023 |

*Primary Examiner* — Daniel Kessie
*Assistant Examiner* — Brian K Baxter

(57) ABSTRACT

A capacitive wireless power transfer coupler, includes: a coupler transmitting side, including two electrode plates arranged in a same plane, a shielding plate parallel to the electrode plates, and a filling dielectric between each of the electrode plates and the shielding plate; a coupler receiving side, having a same structure as the coupler transmitting side. A side provided with the electrode plates of the coupler transmitting side faces a side provided with the electrode plates of the coupler receiving side, and power transfer is achieved between the two sides through a transfer dielectric, where a relative dielectric constant of the filling dielectric is less than a relative dielectric constant of the transfer dielectric. The issues of increased coupler volume, limited improvement in the capacitive coupling coefficient, and low efficiency of power transfer of the existing capacitive coupler, can be solved.

6 Claims, 9 Drawing Sheets

(56) References Cited

U.S. PATENT DOCUMENTS

| | | | | |
|---|---|---|---|---|
| 2013/0082541 | A1* | 4/2013 | Christ | H04B 5/22 |
| | | | | 307/109 |
| 2014/0183973 | A1* | 7/2014 | Sempel | H02J 1/06 |
| | | | | 307/109 |
| 2014/0191587 | A1* | 7/2014 | Van Goor | H01F 38/14 |
| | | | | 307/104 |
| 2015/0255988 | A1* | 9/2015 | Yang | H02J 50/40 |
| | | | | 307/104 |
| 2015/0263570 | A1* | 9/2015 | Van Goor | B32B 17/06 |
| | | | | 428/189 |
| 2016/0006485 | A1* | 1/2016 | Habraken | H04B 5/79 |
| | | | | 333/24 C |
| 2016/0248274 | A1* | 8/2016 | Sempel | H02J 50/05 |
| 2016/0372978 | A1 | 12/2016 | Ichikawa et al. | |
| 2017/0063098 | A1* | 3/2017 | Jeong | H02J 50/05 |
| 2017/0229916 | A1 | 8/2017 | Matsumoto et al. | |
| 2018/0166915 | A1* | 6/2018 | Afridi | H02J 50/05 |
| 2019/0027974 | A1* | 1/2019 | Kanno | H02J 50/70 |
| 2019/0109481 | A1* | 4/2019 | Lee | H02J 7/00712 |
| 2019/0207420 | A1* | 7/2019 | Afridi | H02J 50/70 |
| 2019/0319600 | A1* | 10/2019 | Afridi | H01F 27/2823 |
| 2020/0373783 | A1* | 11/2020 | Afridi | H02J 7/0013 |
| 2021/0143673 | A1* | 5/2021 | Ahn | B64U 50/37 |
| 2021/0226001 | A1* | 7/2021 | Nishita | H10D 1/696 |
| 2021/0268292 | A1* | 9/2021 | Kiele | H02J 50/05 |
| 2022/0255348 | A1* | 8/2022 | Afridi | B60L 53/10 |

* cited by examiner

CAPACITIVE WIRELESS POWER TRANSFER COUPLER AND APPLICATION THEREOF

CROSS-REFERENCE TO RELATED APPLICATIONS

This application claims priority to Chinese Patent Application No. 202311118419.2 with a filing date of Sep. 1, 2023. The content of the aforementioned application, including any intervening amendments thereto, is incorporated herein by reference.

TECHNICAL FIELD

The present disclosure relates to the technical field of wireless power transfer, and in particular, to a capacitive wireless power transfer coupler and a capacitive wireless power transfer system.

BACKGROUND

In recent years, wireless power transfer technology has seen rapid development due to its high safety, good waterproofing, and ease of achieving intelligence without the need for contact points. As two mainstream technologies for wireless power transfer, Capacitive Power Transfer (CPT) and Inductive Power Transfer (IPT) have been applied in underwater charging scenarios. IPT couplers generally consist of coils, magnetic cores, shielding layers, and so on, while CPT couplers typically only require metal plates and insulating layers. Therefore, CPT couplers have lower costs and weight, as well as higher reliability.

To achieve high-power capacitive wireless power transfer to meet the fast charging needs of electric vehicles and ships, researchers worldwide have proposed various high-order compensation networks to raise the voltage between electrode plates of the coupler to the kV level for high-power transmission. However, high voltage brings strong electric field radiation, requiring effective shielding of the electric field to ensure safety. A common method is to add shielding plates on the outer sides of the electrode plates of the coupler, transforming the traditional four-plate structure into a six-plate structure, thereby confining the electric field between the shielding plates.

However, the six-plate structure significantly increases the equivalent self-capacitance of the coupler, leading to a decrease in the capacitive coupling coefficient of the coupler, thereby reducing the efficiency of wireless power transfer. To enhance the capacitive coupling coefficient, the distance between the shielding plate and the power transmission plate needs to be increased. However, this increases the volume of the coupler, and the improvement in the capacitive coupling coefficient is limited, resulting in lower efficiency during high-power wireless charging.

SUMMARY OF PRESENT INVENTION

To address at least one drawback or improvement requirement in the prior art, the present disclosure provides a capacitive wireless power transfer coupler and an application thereof. The aim is to solve the issues of increased coupler volume due to raising the capacitive coupling coefficient by increasing the distance between the shielding plate and the electrode plate, limited improvement in the capacitive coupling coefficient, and low efficiency of power transfer of the existing capacitive coupler.

To achieve the above objectives, according to a first aspect of the present disclosure, a capacitive wireless power transfer coupler is provided, including: a coupler transmitting side, including two electrode plates arranged in a same plane, a shielding plate parallel to the electrode plates, and a filling dielectric between each of the electrode plates and the shielding plate; a coupler receiving side, having a same structure as the coupler transmitting side. A side provided with the electrode plates of the coupler transmitting side faces a side provided with the electrode plates of the coupler receiving side, and power transfer is achieved between the two sides through a transfer dielectric, where a relative dielectric constant of the filling dielectric is less than a relative dielectric constant of the transfer dielectric.

In one embodiment of the present disclosure, the coupler transmitting side and the coupler receiving side each further include an insulating cavity for enclosing the corresponding electrode plates, the shielding plate, and the filling dielectric between each of the electrode plates and the shielding plate.

In one embodiment of the present disclosure, the insulating cavity is a hollow rectangular structure formed by splicing six equally thick insulating plates.

In one embodiment of the present disclosure, at the coupler transmitting side and the coupler receiving side, the electrode plates are tightly attached to an inner wall at one side of the corresponding insulating cavity, while the shielding plate is tightly attached to the inner wall at another side of the corresponding insulating cavity.

In one embodiment of the present disclosure, the electrode plates of the coupler transmitting side and the coupler receiving side have a same shape and a same area, and are positioned opposite each other.

In one embodiment of the present disclosure, at the coupler transmitting side and the coupler receiving side, an area of the shielding plate is greater than a sum of areas of the corresponding two electrode plates.

According to a second aspect of the present disclosure, a capacitive wireless power transfer system is further provided, including: a capacitive wireless power transfer coupler as described in any of the above embodiments; a transmitter circuit, including a power supply, an inverter, and a compensation network, wherein an output terminal of the power supply is connected to an input terminal of the inverter, and an output terminal of the inverter is connected to the electrode plates of the coupler transmitting side through the compensation network; a receiver circuit, including a compensation network and a rectifier, where the electrode plates of the coupler receiving side are connected to the rectifier through the compensation network.

Compared with the prior art, the above technical solutions conceived by the present disclosure can achieve at least the following beneficial effects:

1) Unlike traditional capacitive couplers where all capacitor dielectric materials are the same, the embodiments of the present disclosure propose a concept of hybrid-dielectric capacitive couple. By filling, between each of the electrode plates and the shielding plate on the same side of the coupler, an insulating material with a lower relative dielectric constant than the transfer dielectric, a capacitance value formed between each of the electrode plates and the shielding plate on the same side is reduced, thereby decreasing the equivalent self-capacitance and increasing the capacitive coupling coefficient of the coupler, which is beneficial for improving the efficiency of the coupler.

2) The method for increasing the capacitive coupling coefficient in the embodiments of the present disclosure is achieved through hybrid dielectric, rather than increasing the distance between the electrode plate and the shielding plate. Therefore, the coupler has a smaller volume at the same level of coupling coefficient, making it more suitable for installation on electric vehicles or electric ships.

3) The coupler proposed in the embodiments of the present disclosure has a good electric field shielding effect. Additionally, since the coupler is covered with an insulating layer, it achieves waterproof, corrosion-resistant, electric shock-proof, and leakage-proof characteristics, meeting the practical requirements for electric vehicles/ships, and is also suitable for complex environments such as underwater.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

REFERENCE NUMERALS

P1, P2, P3, P4: electrode plates; P5, P6: shielding plates; E1, E2: filling dielectrics; I1, I2: insulating cavities; $V_{in}$: voltage source; $V_{out}$: constant voltage load; $S_1$, $S_2$, $S_3$, $S_4$: inverter MOSFETs; $D_1$, $D_2$, $D_3$, $D_4$: rectifier diodes; $L_1$, $L_2$, $L_3$, $L_4$: compensation inductors; $C_{f1}$, $C_{f2}$: compensation capacitors; $C_{p1}$, $C_{p2}$: equivalent self-capacitance; $C_M$: equivalent mutual capacitance.

DETAILED DESCRIPTION OF THE EMBODIMENTS

In order to make the objectives, technical solutions, and advantages of the present disclosure more clear, the present disclosure is further described in detail below with reference to the accompanying drawings and embodiments. Understandably, the specific embodiments described herein are merely intended to explain the present disclosure but not to limit the present disclosure. Further, the technical features involved in the various embodiments of the present disclosure described below may be combined with each other as long as they do not constitute a conflict with each other.

The terms "first", "second", "third" and the like in the specification, claims and the accompanying drawings of the present disclosure are intended to distinguish between different objects but do not indicate a specific sequence. Moreover, the terms "include", "have", and any variations thereof are intended to cover non-exclusive inclusion. For example, a process, method, system, product, or device that includes a series of steps or units is not necessarily limited to those steps or units which are listed, but optionally may further include other steps or units which are not listed or inherent to such a process, method, product, or device.

Figure 1:
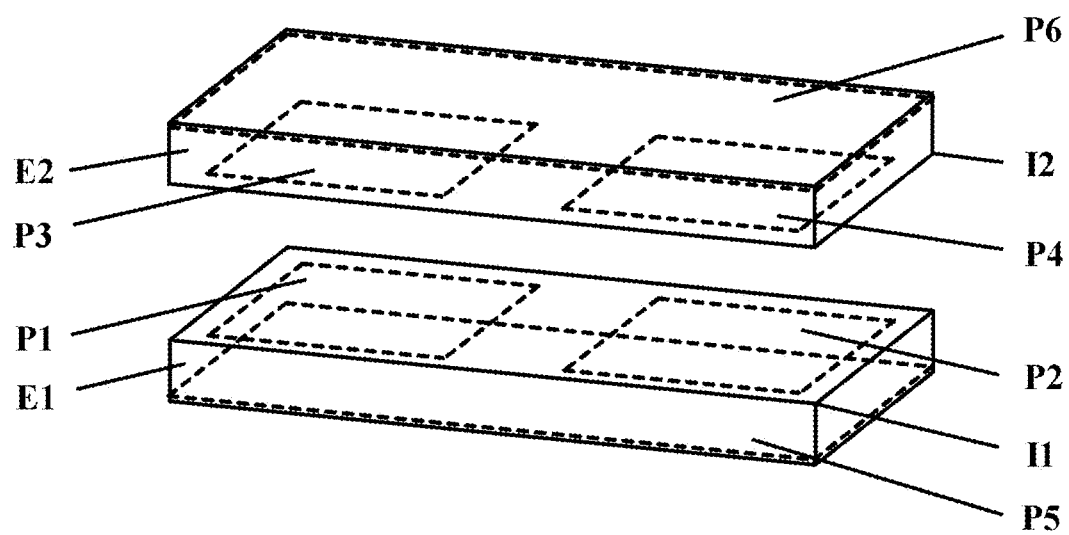
FIG. 1 is a three-dimensional structural schematic diagram of a capacitive wireless power transfer coupler according to an embodiment of the present disclosure.
Figure 2:
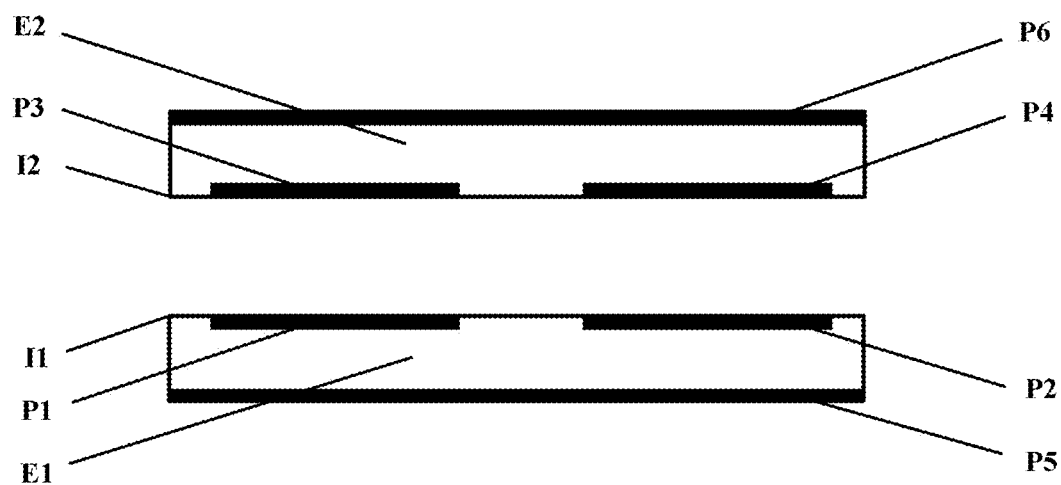
FIG. 2 is structural cross-sectional view of a capacitive wireless power transfer coupler according to an embodiment of the present disclosure.

As shown in FIG. 1 and FIG. 2, the first embodiment of the present disclosure proposes a capacitive wireless power transfer coupler, which includes: an electrode plate P1, an electrode plate P2, an electrode plate P3, an electrode plate P4, a shielding plate P5, a shielding plate P6, a filling dielectric E1, and a filling dielectric E2. The electrode plate P1, the electrode plate P2, the shielding plate P5, and the filling dielectric E1 together form a coupler transmitting side, while the electrode plate P3, the electrode plate P4, the shielding plate P6, and the filling dielectric E2 together form a coupler receiving side. Power transfer is achieved between the coupler transmitting side and the coupler receiving side through a transfer dielectric.

Specifically, the electrode plate P1 and the electrode plate P2 are located in the same plane and are arranged parallel to the shielding plate P5 with a spacing interval, with the filling dielectric E1 placed between the electrode plate P1 and the electrode plate P2. The electrode plate P3 and the electrode plate P4 are also located in the same plane and are arranged parallel to the shielding plate P6 with a spacing interval, with the filling dielectric E2 placed between the electrode plate P3 and the electrode plate P4. The electrode plate P1, the electrode plate P2, the electrode plate P3, the electrode plate P4, the shielding plate P5, and the shielding plate P6 are all made of metal materials. The filling dielectric E1 and the filling dielectric E2 are both insulating materials, and the relative dielectric constant of the filling dielectrics is less than that of the transfer dielectric.

In one embodiment, the coupler transmitting side further includes an insulating cavity I1, and the coupler receiving side further includes an insulating cavity I2. Both the insulating cavity I1 and the insulating cavity I2 are made of insulating materials, for example, a hollow rectangular structure formed by splicing six equally thick insulating plates, which serves to completely enclose the electrode plates, shielding plate, and filling dielectric of the corresponding coupler transmitting side or coupler receiving side.

Figure 3:
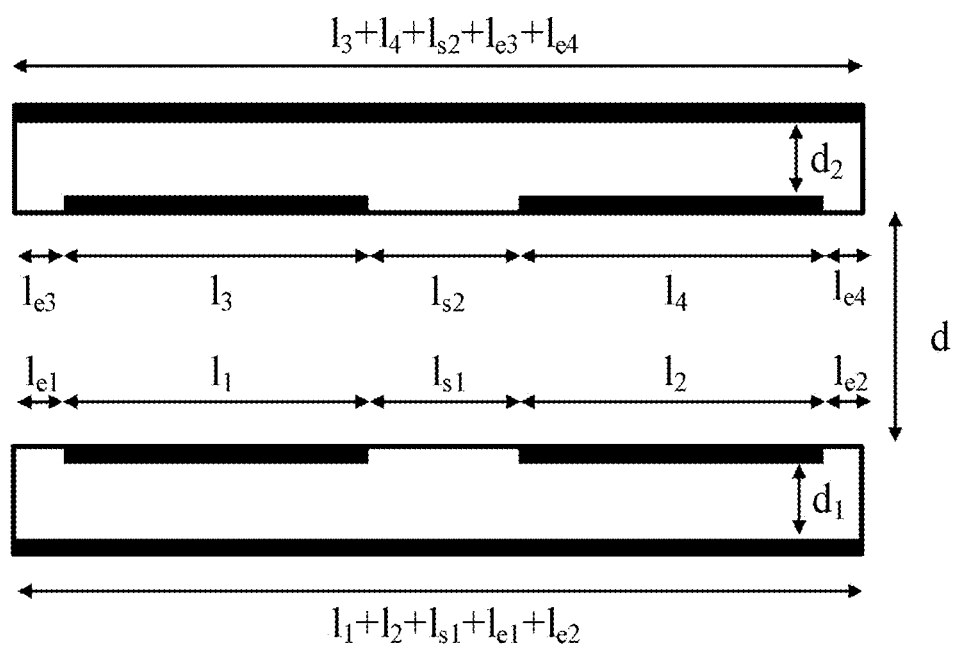
FIG. 3 is a schematic diagram of dimensions and placement positions of components of a capacitive wireless power transfer coupler according to an embodiment of the present disclosure.

As shown in FIG. 3, in one embodiment, preferably, the electrode plates P1, P2, P3, and P4 are all square plate structures, with the electrode plate P1 having a size of $l_1 * l_1$, the electrode plate P2 having a size of $l_2 * l_2$, the electrode plate P3 having a size of $l_3 * l_3$, and the electrode plate P4 having a size of $l_4 * l_4$. Preferably, the shielding plates P5 and P6 are both rectangular plate structures, with the shielding plate P5 having a size of $l_{f1} * l_{w1}$, and the shielding plate P6 having a size of $l_{f2} * l_{w2}$.

Preferably, the entire space from the electrode plate P1 and the electrode plate P2 to the shielding plate P5 is filled with the filling dielectric E1. The transfer dielectric is freshwater (with a relative dielectric constant of 81), and the filling dielectric E1 is air (with a relative dielectric constant of 1), satisfying the condition that the relative dielectric constant of the filling dielectric is less than that of the transfer dielectric. Similarly, the entire space from the electrode plate P3 and the electrode plate P4 to the shielding plate P6 is filled with the filling dielectric E2, which is also air. Preferably, the insulating cavity I1 and the insulating cavity I2 are each formed by six insulating plates made of equally thick epoxy boards. The epoxy board has a thickness of 1 mm.

For the coupler transmitting side, the electrode plate P1 and the electrode plate P2 are kept horizontally aligned and are in close contact with one surface of the insulating cavity I1, with a horizontal distance of $l_{s1}$ between the two electrode plates. The shielding plate P5 remains parallel to the plane of the electrode plates P1 and P2 and is in close contact with another surface of the insulating cavity I1. A horizontal distance from the electrode plate P1 to the edge of the shielding plate P5 is lei, and a horizontal distance from the electrode plate P2 to the edge of the shielding plate P5 is $l_{e2}$. It is evident that $l_{l1}=l_1+l_2+l_{s1}+l_{e1}+l_{e2}$, and $l_{w1}=l_1+2*l_{e1}=l_2+2*l_{e2}$. A vertical distance from the shielding plate P5 to the electrode plates P1 and P2 is $d_1$. The filling dielectric E1 is placed between the shielding plate P5 and the plane of the electrode plates P1 and P2.

For the coupler receiving side, the electrode plates P3 and P4 are kept horizontally aligned and are in close contact with one surface of the insulating cavity I2, with a horizontal distance of $l_{s2}$ between the two electrode plates. The shielding plate P6 remains parallel to the plane of the electrode plates P3 and P4 and is in close contact with another surface of the insulating cavity I2. The electrode plates P3 and P4 are positioned in the middle of the shielding plate P6. A horizontal distance from the electrode plate P3 to the edge of the shielding plate P6 is $l_{e3}$, and a horizontal distance from the electrode plate P4 to the edge of the shielding plate P6 is $l_{e4}$. It is evident that $l_{l2}=l_3+l_4+l_{s2}+l_{e3}+l_{e4}$, and $lw_2=l_3+2*l_{e3}=l_4+2*l_{e4}$. A vertical distance from the electrode plates P3 and P4 to the shielding plate P6 is $d_2$. The filling dielectric E2 is placed between the shielding plate P6 and the plane of the electrode plates P3 and P4.

In one embodiment, the electrode plates P1 and P2 of the coupler transmitting side have a same shape and a same area as the electrode plates P3 and P4 of the coupler receiving side. During the process of wireless power transfer, the transmitting side and the receiving side are kept facing each other. Therefore, the electrode plate P1 is kept facing the electrode plate P3, the electrode plate P2 is kept facing the electrode plate P4, and the shielding plate P5 is kept facing the shielding plate P6. A transmission distance from the coupler transmitting side to the coupler receiving side is denoted as d. Preferably, an area of the shielding plate P5 at the coupler transmitting side is greater than a sum of areas of the electrode plates P1 and P2, so that the shielding plate P5 can cover the electrode plates P1 and P2 while an area of the shielding plate P6 at the coupler receiving side is greater than a sum of areas of the electrode plates P3 and P4, so that the shielding plate P6 can cover the electrode plates P3 and P4.

Figure 4:
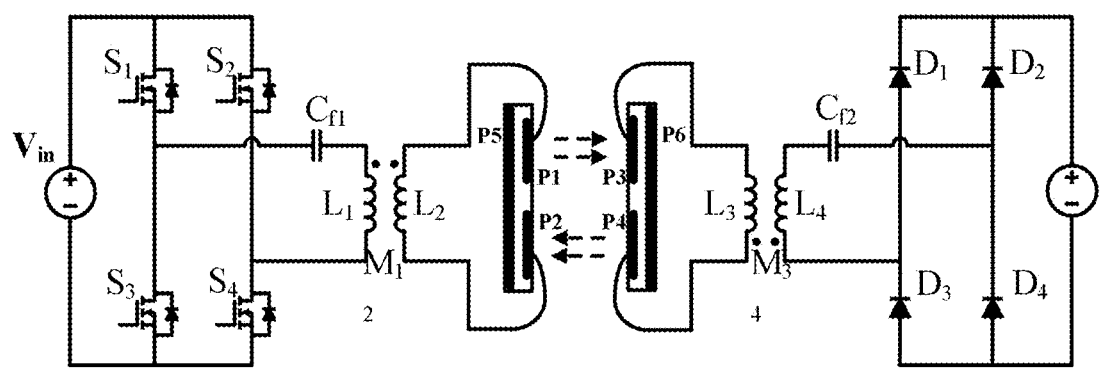
FIG. 4 is a schematic structural diagram of a capacitive wireless power transfer system according to an embodiment of the present disclosure.
Figure 5:
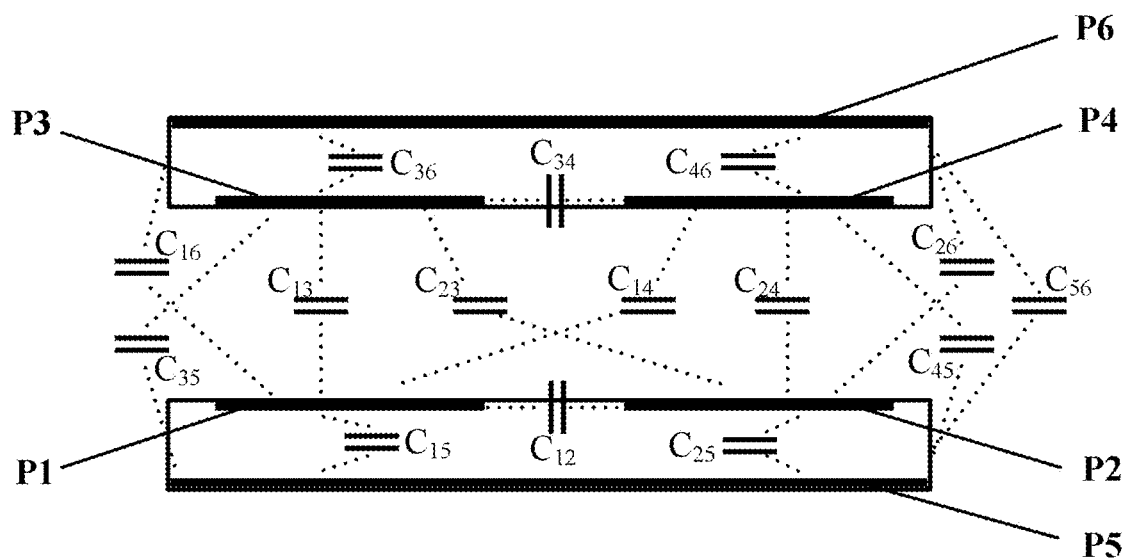
FIG. 5 is a schematic diagram showing capacitance formed between plates of a capacitive wireless power transfer coupler according to an embodiment of the present disclosure.

As shown in FIG. 4, during wireless power transfer, the electrode plates P1 and P2 are connected to a transmitter circuit, the electrode plates P3 and P4 are connected to a receiver circuit, and the shielding plates P5 and P6 are not connected to any power supply, remaining at zero potential. According to the mechanism of capacitance generation, a capacitance is generated between every two plates. As shown in FIG. 5, the capacitance between the electrode plate P1 and the electrode plate P2 is denoted as $C_{12}$, the capacitance between the electrode plate P1 and the electrode plate P3 is denoted as $C_{13}$, the capacitance between the electrode plate P1 and the shielding plate P5 is denoted as $C_{15}$, and so on, resulting in a total of 15 capacitances denoted as $C_{12}$ to $C_{56}$ within the six plates.

Figure 6:
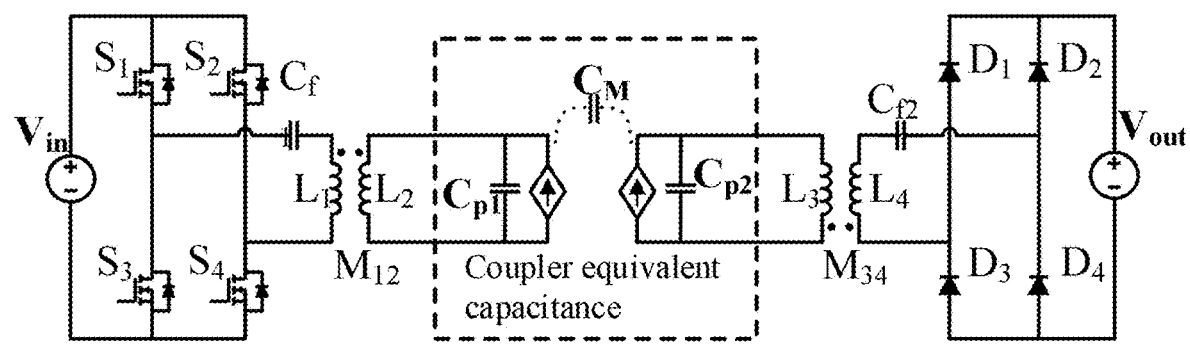
FIG. 6 is an equivalent circuit diagram of a capacitive wireless power transfer system according to an embodiment of the present disclosure.

As shown in FIG. 6, based on the series and parallel relationships of the 15 capacitances, they can be equivalent to 3 capacitances in the circuit, namely, two self-capacitances $C_{p1}$ and $C_{p2}$, and one mutual capacitance $C_M$. To calculate the values of the equivalent self-capacitances and mutual capacitance, specific dimensional parameters of the coupler are assigned as follows:

$l_1=l_2=l_3=l_4=200$ mm, $l_{s1}=l_{s2}=100$ mm, $l_{e1}=l_{e2}=20$ mm, $l_{l1}=l_1+l_2+l_{s1}+l_{e1}+l_{e2}=540$ mm, $l_{w1}=l_1+2*l_{e1}=l_2+2*l_{e2}=240$ mm. A vertical distance from the electrode plates P1 and P2 to the shielding plate P5 is $d_1=10$ mm. A vertical distance from the electrode plates P3 and P4 to the shielding plate P6 is $d_2=10$ mm. A transmission distance $d=100$ mm.

The filling dielectric E1 and the filling dielectric E2 are both air, with a relative dielectric constant of 1. The transfer dielectric is freshwater, with a relative dielectric constant of 81. This satisfies that the relative dielectric constant of the filling dielectric is less than that of the transfer dielectric. The materials of the insulating cavity I1 and the insulating cavity I2 are epoxy boards with a relative dielectric constant of 4.4.

The 15 capacitance values $C_{12}$ to $C_{56}$ between any two plates are obtained through finite element simulation. $C_{12}=20.489$ pF, $C_{13}=159.33$ pF, $C_{14}=19.299$ pF, $C_{15}=141.83$ pF, $C_{16}=81.012$ pF, $C_{23}=19.28$ pF, $C_{24}=159.57$ pF, $C_{25}=141.8$ pF, $C_{26}=80.995$ pF, $C_{34}=20.414$ pF, $C_{35}=80.788$ pF, $C_{36}=141.83$ pF, $C_{45}=80.936$ pF, $C_{46}=142.03$ pF, $C_{56}=337.9$ pF.

Based on the 15 capacitances, the equivalent capacitance values $C_M$, $C_{p1}$, and $C_{p2}$ in a wireless power transfer equivalent circuit are calculated using series and parallel connection formulas, with the calculation formulas as follows:

$$C_M = \frac{C_{24}C_{13} - C_{14}C_{23}}{C_{13}+C_{14}+C_{23}+C_{24}} + \frac{\frac{C_{15}C_{26}-C_{16}C_{25}}{C_{15}+C_{16}+C_{25}+C_{26}} \cdot \frac{C_{35}C_{46}-C_{36}C_{45}}{C_{35}+C_{36}+C_{45}+C_{46}}}{C_{56}+\frac{(C_{15}+C_{25})(C_{16}+C_{26})}{C_{15}+C_{16}+C_{25}+C_{26}}+\frac{(C_{35}+C_{45})(C_{36}+C_{46})}{C_{35}+C_{36}+C_{45}+C_{46}}};$$

$$C_{p1} = C_M + C_{12} + \frac{(C_{13}+C_{14})(C_{23}+C_{24})}{C_{13}+C_{14}+C_{23}+C_{24}} + \frac{(C_{15}+C_{16})(C_{25}+C_{26})}{C_{15}+C_{16}+C_{25}+C_{26}} - \frac{\left(\frac{C_{15}C_{26}-C_{16}C_{25}}{C_{15}+C_{16}+C_{25}+C_{26}}\right)^2}{C_{56}+\frac{(C_{15}+C_{25})(C_{16}+C_{26})}{C_{15}+C_{16}+C_{25}+C_{26}}+\frac{(C_{35}+C_{45})(C_{36}+C_{46})}{C_{35}+C_{36}+C_{45}+C_{46}}};$$

$$C_{p2} = C_M + C_{34} + \frac{(C_{13}+C_{23})(C_{14}+C_{24})}{C_{13}+C_{14}+C_{23}+C_{24}} + \frac{(C_{35}+C_{36})(C_{45}+C_{46})}{C_{35}+C_{36}+C_{45}+C_{46}} - \frac{\left(\frac{C_{35}C_{46}-C_{36}C_{45}}{C_{35}+C_{36}+C_{45}+C_{46}}\right)^2}{C_{56}+\frac{(C_{15}+C_{25})(C_{16}+C_{26})}{C_{15}+C_{16}+C_{25}+C_{26}}+\frac{(C_{35}+C_{45})(C_{36}+C_{46})}{C_{35}+C_{36}+C_{45}+C_{46}}}.$$

The equivalent capacitance values obtained through calculation are as follows: $C_{p1}=221.27$ pF, $C_{p2}=221.27$ pF, $C_M=70.08$ pF.

The capacitance coupling coefficient is calculated based on the equivalent capacitance values, with the calculation formula as follows:

$$k = \frac{C_M}{\sqrt{C_{p1} \times C_{p2}}}.$$

The capacitance coupling coefficient obtained through calculation is k=0.316.

In this embodiment, a four-coil compensation network is used. Parameters of other compensation networks in the wireless power transfer system are calculated based on the equivalent capacitance values $C_{p1}$, $C_{p2}$, and $C_M$ of the coupler, where $C_{f1}=C_{f2}=1.5$ nF, $L_1=L_4=16.7$ uH, and $L_2=L_3=127.3$ uH.

Figure 7:
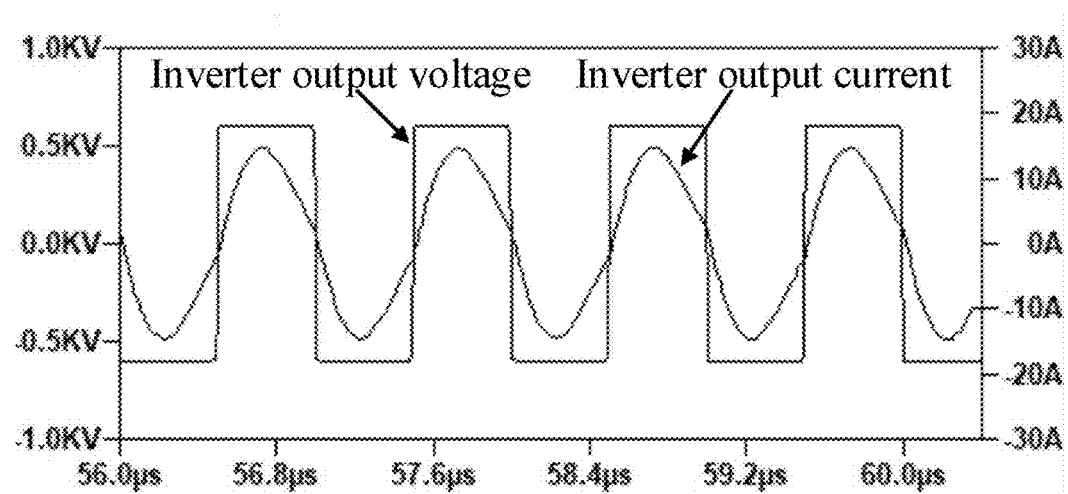
FIG. 7 is a waveform diagram of an output voltage and current of an inverter in a capacitive wireless power transfer system according to an embodiment of the present disclosure.
Figure 8:
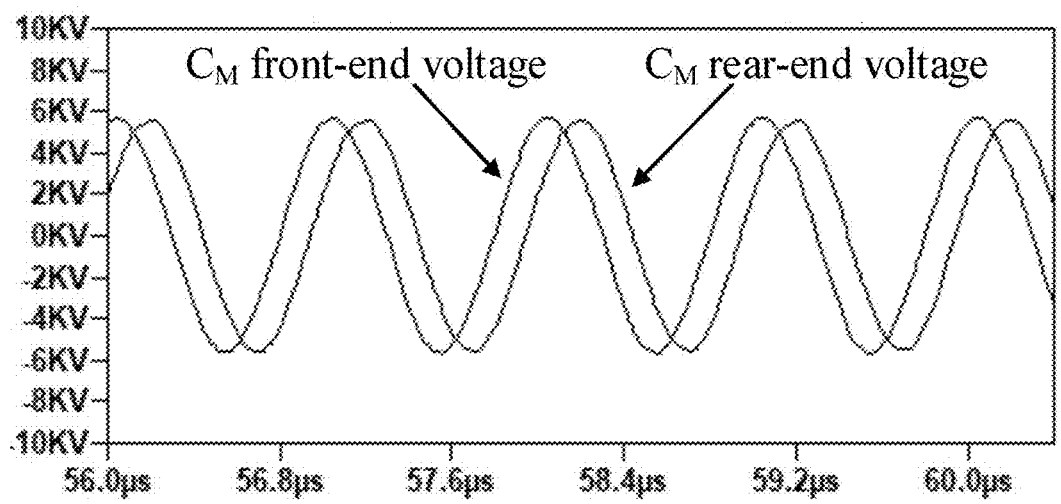
FIG. 8 is a waveform diagram of a front-end voltage and a rear-end voltage of a coupling capacitor in a capacitive wireless power transfer system according to an embodiment of the present disclosure.
Figure 9:
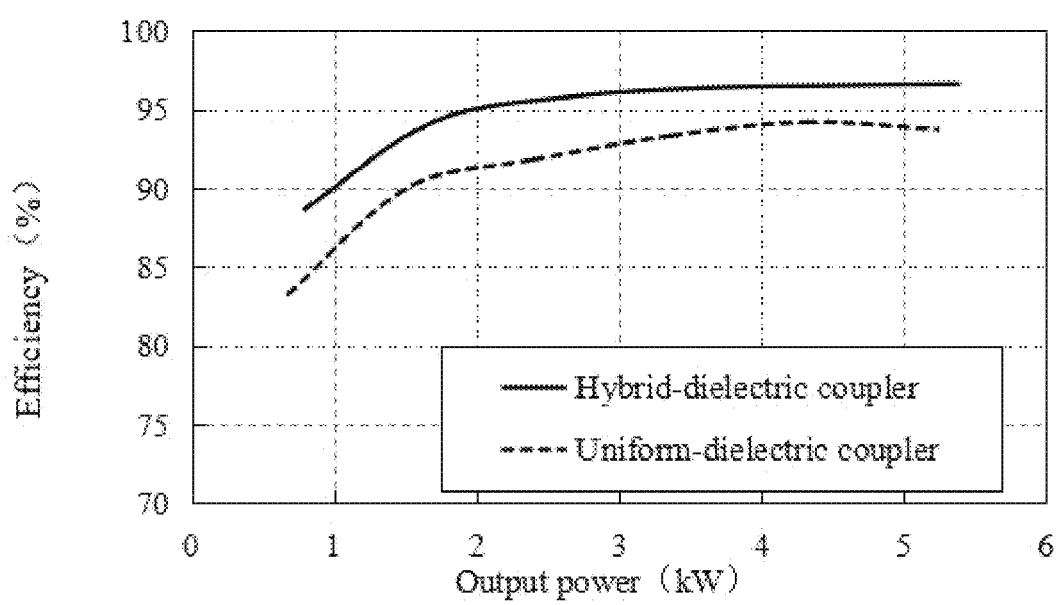
FIG. 9 illustrates comparison between power transfer efficiency of a capacitive wireless power transfer coupler provided in an embodiment of the present disclosure and power transfer efficiency of a traditional coupler.

The system is simulated using Ltspice simulation software, with quality factors set for $C_{f1}$, $C_{f2}$, and $L_1$-$L_4$ being 500, quality factors set for $C_{p1}$, $C_{p2}$, and $C_M$ being 1000, and a frequency of an inverter being 1 MHz. As shown in FIG. 7, an output voltage of the inverter is a square wave, and an output current of the inverter is a sine wave. From the perspective of voltage and current phases, soft switching, namely, zero-voltage-switching (ZVS), is achieved for inverter MOSFETs. As shown in FIG. 8, the voltage before and after the coupling capacitor is sine waves with equal amplitudes and a phase difference of approximately 56 degrees. As shown in FIG. 9, an efficiency curve for the full power range is obtained by adjusting the output power, with a peak efficiency of 96.7%.

To better demonstrate the advantages of the capacitive wireless power transfer coupler of this embodiment in terms of the capacitance coupling coefficient and transmission efficiency, it is compared with a traditional coupler where the filling dielectric E1 and the filling dielectric E2 are the same as the transfer dielectric, for example, both being freshwater with a relative dielectric constant of 81.

The 15 capacitance values $C_{12}$ to $C_{56}$ between any two plates are obtained through finite element simulation. $C_{12}=11.389$ pF, $C_{13}=143.48$ pF, $C_{14}=10.441$ pF, $C_{15}=873.81$ pF, $C_{16}=106.76$ pF, $C_{23}=10.441$ pF, $C_{24}=143.46$ pF, $C_{25}=873.74$ pF, $C_{26}=106.78$ pF, $C_{34}=11.39$ pF, $C_{35}=106.79$ pF, $C_{36}=873.66$ pF, $C_{45}=106.76$ pF, $C_{46}=873.83$ pF, $C_{56}=477.62$ pF. The equivalent capacitance values calculated based on the 15 capacitances are as follows: $C_{p1}=578.6$ pF, $C_{p2}=578.6$ pF, $C_M=66.515$ pF. The capacitance coupling coefficient calculated based on the equivalent capacitance values is k=0.115. It is evident that this coupling coefficient is significantly lower than the coupling coefficient of the capacitive wireless power transfer coupler provided in this embodiment.

Similarly, a four-coil compensation network is used. Parameters of other compensation networks in the wireless power transfer system are calculated based on the equivalent capacitance values $C_{p1}$, $C_{p2}$, and $C_M$ of the coupler, where $C_{f1}=C_{f2}=4.2$ nF, $L_1=L_4=6$ uH, and $L_2=L_3=44.4$ uH. The system is simulated using Ltspice simulation software, with quality factors set for $C_{f1}$, $C_{f2}$, and $L_1$-$L_4$ being 500, quality factors set for $C_{p1}$, $C_{p2}$, and $C_M$ being 1000, and a frequency of an inverter being 1 MHz, which are consistent with the settings for the simulation of the capacitive wireless power transfer coupler provided in this embodiment. As shown in FIG. 9, an efficiency curve for the full power range is obtained by adjusting the output power, with a peak efficiency of 93.8%. The transmission efficiency across the full power range is lower than that of the capacitive wireless power transfer coupler provided in this embodiment.

It can be seen that under the same coupler size, compensation network type, component quality factor, inverter frequency, transmission distance, and other conditions, the capacitive wireless power transfer coupler provided in this embodiment achieves a significant improvement in the capacitance coupling coefficient compared to the traditional capacitive coupler, thereby greatly enhancing the transmission efficiency of the system.

In summary, in the capacitive wireless power transfer coupler provided in the first embodiment of the present disclosure, by filling, between each of the electrode plates and the shielding plate on the same side of the capacitive coupler, an insulating material with a lower relative dielectric constant than the transfer dielectric, a capacitance value formed between each of the electrode plates and the shielding plate on the same side is reduced, thereby decreasing the equivalent self-capacitance and increasing the capacitive coupling coefficient of the coupler, which is beneficial for improving the efficiency of the coupler. The capacitive coupling coefficient is increased through hybrid dielectric, rather than increasing the distance between the electrode plate and the shielding plate. Therefore, the coupler has a smaller volume at the same level of coupling coefficient, making it more suitable for installation on electric vehicles or electric ships. The coupler is covered with an insulating layer, it has a good electric field shielding effect, and achieves waterproof, corrosion-resistant, electric shock-proof, and leakage-proof characteristics, meeting the practical requirements for electric vehicles/ships. The coupler is also suitable for complex environments such as underwater.

It should be noted that the capacitive wireless power transfer coupler proposed in the first embodiment does not impose restrictions on the shapes of the electrode plates and the shielding plates. Any electrode plates and the shielding plates that comply with the relative positional relationships among the plates in the embodiments of the present disclosure shall fall within the scope of protection of the disclosure. There are no restrictions on the specific material of the filling dielectric, which can be in any state: solid, liquid, or gas. Any material with a relative dielectric constant less than that of the transfer dielectric shall fall within the protection scope of the present disclosure.

Additionally, a second embodiment of the present disclosure proposes a capacitive wireless power transfer system. As shown in FIG. 4, for example, the capacitive wireless power transfer system includes: a capacitive wireless power transfer coupler as described in the first embodiment, a transmitter circuit, and a receiver circuit.

The transmitter circuit includes a power supply, an inverter, and a compensation network. An output terminal of the power supply is connected to an input terminal of the inverter, and an output terminal of the inverter is connected to the electrode plates of the coupler transmitting side through the compensation network. The receiver circuit includes a compensation network and a rectifier, with the electrode plates of the coupler receiving side connected to the rectifier through the compensation network.

For the specific structure and functions of the capacitive wireless power transfer coupler, reference can be made to the content described in the first embodiment, and details will not be described herein again. The beneficial effects of this embodiment are the same as those of the first embodiment, and for the sake of brevity, details are not described herein again.

It should be noted that the capacitive wireless power transfer coupler proposed in the embodiments of the present disclosure serves as a component within the capacitive wireless power transfer system and can be combined with other components in various configurations, thus allowing for multiple specific implementations. The second embodiment employs a full-bridge inverter, a full-bridge rectifier, and a four-coil compensation network. It will be readily understood by those skilled in the art that other forms of inverters, rectifiers, and compensation networks can also be used in combination with the coupler proposed in the present disclosure, and all such combinations shall fall within the protection scope of the present disclosure.

Described above are merely exemplary embodiments of the present disclosure, which cannot be construed as a limitation on the scope of the present disclosure. Any equivalent changes and modifications made in accordance with the teachings of the present disclosure still fall within the scope of the present disclosure. A person skilled in the art can easily think of other implementation solutions of the present disclosure after considering the specification and practicing the content disclosed herein. The present disclosure is intended to cover any variations, purposes or applicable changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the scope and spirit of the present disclosure are defined by the claims.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

It is easy for those skilled in the art to understand that the above-mentioned contents are merely the preferred embodiments of the present disclosure, and are not intended to limit the present disclosure. Any modifications, equivalent substitutions and improvements made within the spirit and principles of the present disclosure should fall within the protection scope of the present disclosure.

What is claimed is:

1. A capacitive wireless power transfer coupler, comprising:
   a coupler transmitting side, comprising two electrode plates arranged in a same plane, a shielding plate arranged parallel to the two electrode plates with a spacing interval, and a filling dielectric between each of the two electrode plates and the shielding plate; and
   a coupler receiving side, having a same structure as the coupler transmitting side;
   wherein a side provided with the two electrode plates of the coupler transmitting side faces another side provided with the two electrode plates of the coupler receiving side, and power transfer is achieved between the coupler transmitting side and coupler receiving side through a transfer dielectric; a relative dielectric constant of the filling dielectric is less than a relative dielectric constant of the transfer dielectric;
   wherein at the coupler transmitting side, an area of the shielding plate is greater than a sum of areas of the two electrode plates in the coupler transmitting side;
   wherein the coupler transmitting side further comprise an insulating cavity for enclosing the two electrode plates in the coupler transmitting side, the shielding plate in the coupler transmitting side, and the filling dielectric in the coupler transmitting side; the coupler receiving side further comprise an insulating cavity for enclosing corresponding the two electrode plates in the coupler receiving side, the shielding plate in the coupler receiving side, and the filling dielectric in the coupler receiving side.

2. The capacitive wireless power transfer coupler according to claim 1, wherein the insulating cavity is a hollow rectangular structure formed by splicing six equally thick insulating plates.

3. The capacitive wireless power transfer coupler according to claim 1, wherein at the coupler transmitting side and the coupler receiving side, the two electrode plates are tightly attached to an inner wall at one side of the insulating cavity, while the shielding plate is tightly attached to the inner wall at another side of the insulating cavity.

4. The capacitive wireless power transfer coupler according to claim 1, wherein the two electrode plates of the coupler transmitting side and the coupler receiving side have a same shape and a same area, and are positioned opposite each other.

5. The capacitive wireless power transfer coupler according to claim 1, wherein the filling dielectric is air, and the transfer dielectric is water.

6. A capacitive wireless power transfer system, comprising:
   the capacitive wireless power transfer coupler according to claim 1;
   a transmitter circuit, comprising: a power supply, an inverter, and a first compensation network, wherein an output terminal of the power supply is connected to an input terminal of the inverter, and an output terminal of the inverter is connected to the two electrode plates of the coupler transmitting side through the first compensation network; and
   a receiver circuit, comprising: a second compensation network and a rectifier, with the two electrode plates of the coupler receiving side connected to the rectifier through the second compensation network.

* * * * *